United States Patent [19]

Benford

[11] Patent Number: 4,707,401

[45] Date of Patent: Nov. 17, 1987

[54] REFRIGERATOR CABINET CONSTRUCTION

[75] Inventor: Arthur E. Benford, German Township, Vanderburgh County, Ind.

[73] Assignee: Whirlpool Corporation, Benton Harbor, Mich.

[21] Appl. No.: 940,928

[22] Filed: Dec. 12, 1986

[51] Int. Cl.⁴ .................. F25D 23/08; B32B 5/20; B32B 7/06

[52] U.S. Cl. .................. 428/317.5; 220/444; 220/902; 312/214; 428/319.7

[58] Field of Search .......... 220/444, 920; 312/214; 428/314.4, 314.8, 317.5, 319.1, 319.3, 319.7

[56] References Cited

U.S. PATENT DOCUMENTS

| | | | |
|---|---|---|---|
| 3,091,946 | 6/1963 | Kesling | 428/319.7 |
| 3,294,462 | 12/1966 | Kesling | 312/214 |
| 3,862,880 | 1/1975 | Feldman | 428/319.9 |
| 3,923,355 | 12/1975 | Dietterich | 312/214 |
| 3,960,631 | 6/1976 | Weiss et al. | 156/244 |
| 4,005,919 | 2/1977 | Hoge et al. | 312/214 |
| 4,048,274 | 9/1977 | Hoge et al. | 264/46.5 |
| 4,196,950 | 4/1980 | Churchill et al. | 312/214 |

Primary Examiner—William J. Van Balen
Attorney, Agent, or Firm—Wood, Dalton, Phillips, Mason & Rowe

[57] ABSTRACT

A refrigeration apparatus cabinet construction wherein foamed insulation is formed in situ between an outer metal cabinet shell and an inner synthetic resin liner. The liner is provided, before thermoforming thereof, with an outer bilayer film having an inner portion bonded to the liner, with a reduced strength of approximately 3 to 7 ounces per inch of width. The film includes an outer portion having a firm bond with the urethane foam.

9 Claims, 4 Drawing Figures

REFRIGERATOR CABINET CONSTRUCTION

BACKGROUND OF THE INVENTION

1. Field of the Invention

This invention relates to cabinet constructions and in particular to insulative refrigeration apparatus cabinet constructions.

2. Description of the Background Art

An improved refrigeration appliance liner construction is disclosed in U.S. Pat. No. 3,960,631 of Leonard E. Weiss et al., which patent is owned by the assignee hereof. As disclosed therein, a foam release agent is provided on the plastic liner sheet prior to the forming thereof into the liner configuration. The foam release agent comprises a film laminated to the liner sheet as by utilizing the heat of extrusion of the liner sheet with concurrent application of pressure. The disclosed film comprises a coextruded film including a first sheet of unmodified low density polyethylene and a sheet of ethylene acrylic acid copolymer which is electrostatically treated to promote adhesion to the ABS synthetic resin liner wall.

The problem addressed by the Weiss et al patent is that foamed-in-place insulation tends to adhere to the liner wall which is conventionally formed of a synthetic resin. Because of temperature changes, stress cracking of the liner often results both from propagation of stress cracks developed in the foam to the liner wall and from the differential thermal expansions of the foamed insulation and the liner wall material. A common proposed solution to this problem has been to apply a foam release agent to the liner wall. This procedure, however, is relatively expensive as it requires additional steps in the manufacturing process involving relatively expensive labor.

It has become conventional in refrigeration apparatus cabinets to form the outer wall, or shell, of prepainted sheet metal. The use of such prepainted material effectively precludes the welding of the corners of the cabinet because of the discolorations caused by said welding. The use of less rigid joint means results in a substantially less rigid outer shell structure. While the foamed-in-place insulation sets up to define a rigid body, the fact that there is only limited adhesion between the outer surface of the liner wall and the foamed-in-place insulation precludes the provision of a double-stressed skin laminate system. There has not heretofore been a completely satisfactory solution to the problems resulting from utilizing prepainted panels in such cabinets.

SUMMARY OF THE INVENTION

The present invention comprehends a further improved insulative cabinet wall structure for use in refrigeration apparatus and the like wherein the foamed insulation, the intermediate bonding film, and the outer shell are effectively bonded together to define a double-stressed wall system.

In the illustrated embodiment, a bilayer film is provided having a controlled limited bond with the synthetic resin liner so as to effectively prevent stress cracking thereof. The film, however, further has a strong, absolute bonding to the foamed-in-place insulation so that a desirable double-stressed skin laminate is effectively provided.

The provision of the novel film sheet having controlled desirable adhesion to both the liner and the a strong bond to insulative foam provides a substantial improvement in the art of insulative cabinet wall structures.

In the illustrated embodiment, the film includes a first layer containing copolymers of ethylene and vinyl acetate adhered to the liner, and a second, opposite layer containing copolymers of ethylene and acrylic acid having strong adhesion to the foamed-in-place polyurethane insulation.

The laminate film illustratively may be formed by coextrusion of the two copolymerized layers.

The insulative cabinet wall structure of the invention is extremely simple and economical while yet providing a substantially improved double-stress wall structure providing improved integrity of the cabinet while concurrently avoiding stress cracking of the liner.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
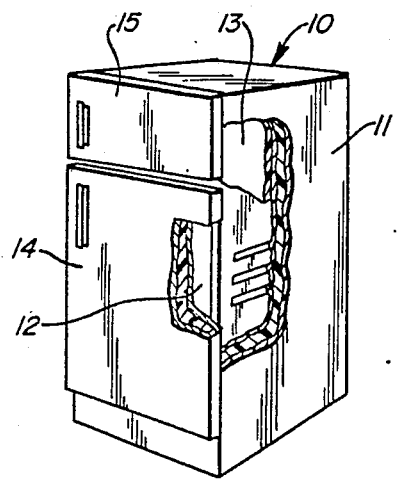
FIG. 1 is a perspective view of a refrigeration apparatus having an insulative cabinet wall structure embodying the invention, with portions broken away to illustrate the insulative structure.

In the exemplary embodiment of the invention as disclosed in the drawing, a refrigeration apparatus generally designated 10 illustratively comprises a refrigerator/freezer apparatus having an outer cabinet 11 defining an above freezing space 12 and a below freezing space 13 selectively closed by doors 14 and 15, respectively.

The present invention is concerned with an improved cabinet construction wherein a film 16 is adhered to the inner synthetic resin liner 17, and a body of urethane foam 18 formed between the film 16 and the outer metal cabinet wall, or shell, 19.

In the illustrated embodiment, the film is caused to have an adhesive bond with the liner, having a pull-away strength in the range of approximately 3 to 7 ounces per inch of width. In the illustrated embodiment, the liner is formed of acrylonitrile-butadiene-styrene resin and the film 16 comprises a laminated coextruded bilayer film including an inner film 20 containing copolymers of ethylene and vinyl acetate, and an outer film 21 containing copolymers of ethylene and acrylic acid. One such laminate film is Dow Chemical Company coextruded film XU 66300.41.

It has been found that the polyurethane foam achieves a firm bond with the film 21 and with the metal shell 19. The limited strength bond between the film 20 and the synthetic resin liner 17 effectively avoids stress cracking and permits the liner material to be reprocessed, when desired.

The formation of the firm bond between the polyurethane foam and the outer film 21 provides for improved structural integrity of the cabinet in contradistinction to the prior art structures, wherein a readily breakable bond with the foam was provided.

In addition, the copolymerized ethylene and vinyl acetate film 21 has been found to maintain the desirable absorption of the cracking forces notwithstanding the effective bonding of the layer to the foam.

More specifically, it has been found that, as a result of the foaming-in-place formation of the urethane insulation, a skin of urethane is formed adhering to the confronting surface of the film. For any of a number of reasons, from time to time, cracks form in the skin causing a substantially instantaneous release of energy to the film 21. The film 21, being effectively resiliently yieldable, dissipates the short, high forces, thereby effectively precluding transfer thereof to the liner and avoiding cracking of the liner.

By effectively avoiding the need for use of coating adhesives, the present invention effectively minimizes cost and manufacturing problems. The bilayer film 16 may be adhered to the liner blank prior to the thermoforming thereof, with the bond between the film portion 20 and the liner blank being of sufficient strength to accommodate the forces generated in the thermoforming operation while maintaining the adhesion of the film 16 to the liner. However, if for any reason, the formed liner is rejected, the film may be peeled off and the material of the liner comminuted and reused.

Figure 4:
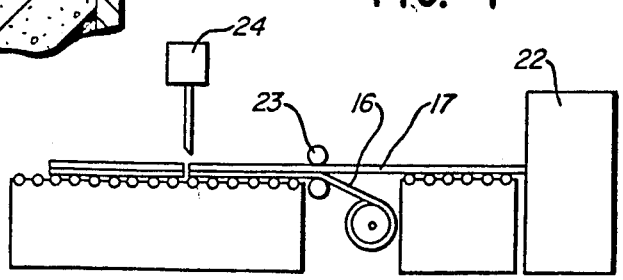
FIG. 4 is a schematic side elevation of an apparatus for forming the improved liner construction of the invention.

In the forming process as shown in FIG. 4, the liner material 17 is provided in sheet form from an extruder 22. Bilayer film 16 is fed from suitable rolls and layer 20 thereof bonded to the confronting surface of the liner material 17 through application of pressure as by pressure rolls 23.

Figure 2:
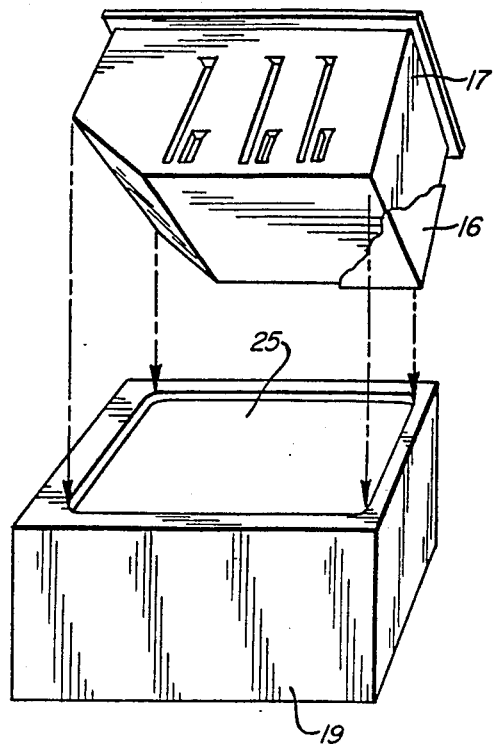
FIG. 2 is a perspective view illustrating the assembly of the preformed liner embodying the invention, with the outer metal shell of the cabinet.
Figure 3:
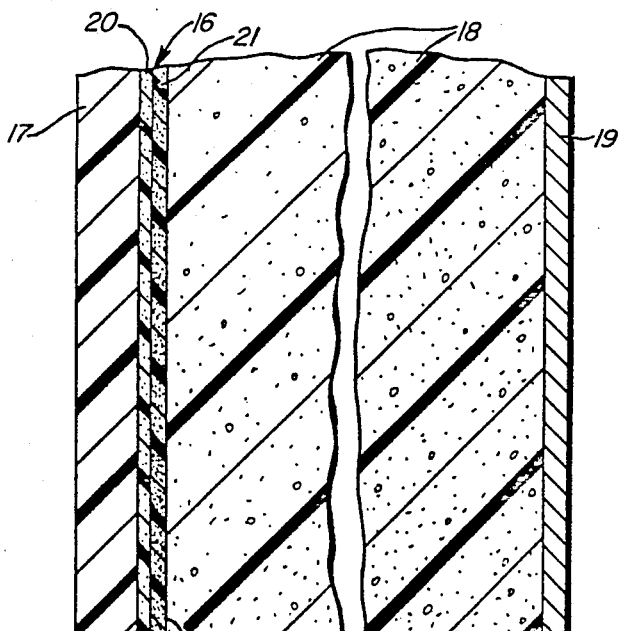
FIG. 3 is a fragmentary enlarged cross section of the wall structure.

The liner and bonding film composite is then cut to desired length by a suitable cutter 24 and thermoformed into a liner construction 17, wherein the outer surface is defined by the film 16, as shown in FIG. 2. The thermoformed liner is then inserted into the cavity 25 of the outer cabinet shell 19, permitting the urethane to be foamed in place therebetween and defining the wall construction illustrated in FIG. 3.

Thus, the invention broadly comprehends the provision of an improved refrigeration apparatus cabinet construction wherein a bonding film is adhered to the outer surface of the liner, prior to the thermoforming thereof, with a limited strength bond therebetween preselected to prevent stress cracking in the use of the refrigeration apparatus. It has been found that a strength between the bonding film and the liner in the range of approximately 3 to 7 ounces per inch of width effectively provides the desired stress cracking prevention and permits removal of the film, when desired as discussed above.

The film further includes an outer layer portion which is firmly bonded to the inner layer portion and which has a firm bond with the foamed-in-place urethane insulation, in turn bonded to the inner surface of the outer metal cabinet wall 19. By virture of the firm bond of the film 21 with the insulation, improved structural integrity of the cabinet is provided, thus permitting the use of prepainted panels in forming the outer shell having relatively low rigidity.

The foregoing disclosure of specific embodiments is illustrative of the broad inventive concepts comprehended by the invention.

I claim:

1. An insulative cabinet wall structure for use in refrigeration apparation and the like, said wall structure comprising:
    a first wall element defining a first surface portion;
    a second wall element formed of a synthetic resin defining a second surface portion in spaced juxtaposition to said first surface portion of the first wall;
    a laminate bonding film having a third surface portion peelably bonded to said second surface portion of the second wall, and an opposite fourth surface portion formed of a material different from the material of which said third surface portion of the bonding film is formed; and
    foamed-in-situ polyurethane foam firmly bonded to said first surface portion of the first wall element and said fourth surface portion of said bonding film.

2. An insulative cabinet wall structure of use in refrigeration apparatus and the like, said wall structure comprising:
    a first wall element defining a first surface portion;
    a second wall element formed of a synthetic resin defining a second surface portion in spaced juxtaposition to said first surface portion of the first wall;
    a laminate bonding film having a third surface portion peelably bonded to said second surface portion of the second wall with an adhesive strength in the range of approximately 3 to 7 ounces per inch of width and an opposite fourth surface portion formed of a material different from the material of which said third surface portion of the bonding film is formed; and
    foamed-in-situ polyurethane foam firmly bonded to said first surface portion of the first wall element and to said fourth surface portion of said bonding film with an adhesive strength at least as great as that of the third surface portion to said surface portion.

3. The insulative cabinet wall structure of claims 1 or 2 wherein said third surface portion of said bonding film is formed of polyethylene and ethylene vinyl acetate-acrylic acid polymer.

4. The insulative cabinet wall structure of claims 1 or 2 wherein said fourth surface portion of said bonding film is formed of a mixture of acrylic acid and polyethylene.

5. The insulative cabinet wall structure of claims 1 or 2 wherein said fourth surface portion of said bonding film is formed of a copolymer of ethylene vinyl acrylic acid and polyethylene.

6. An insulative cabinet wall structure for use in refrigeration apparatus and the like, said wall structure comprising:
    a first wall element defining a first surface portion;
    a second wall element formed of a synthetic resin defining a second surface portion in spaced juxtaposition to said first sufface portion of the first wall;
    a laminate bonding film having a third surface portion formed of ethylene vinyl acetate copolymer peelably bonded to said second surface portion of the second wall, and an opposite fourth surface portion comprising a mixture of acrylic acid and polyethylene; and
    foamed-in-siut polyurethane foam firmly bonded to said first surface portion of the first wall element and said fourth portion of said bonding film.

7. The insulative cabinet wall structure of claim 6 wherein said fourth surface portion of said bonding film comprises a copolymer of ethylene vinyl acrylic acid and polyethylene.

8. The insulative cabinet wall structure of claim 6 wherein said first wall element is formed of prepainted metal.

9. The insulative cabinet wall structure of claim 6 wherein said synthetic resin is acrylonitrile-butadienes-tyrene resin.

* * * * *